(12) United States Patent
Yu et al.

(10) Patent No.: US 8,885,575 B2
(45) Date of Patent: Nov. 11, 2014

(54) RELAY LINK CONTROL CHANNEL DESIGN

(75) Inventors: Yi Yu, Irving, TX (US); Zhijun Cai, Euless, TX (US); James Earl Womack, Bedford, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 247 days.

(21) Appl. No.: 12/722,409

(22) Filed: Mar. 11, 2010

(65) Prior Publication Data

US 2010/0232546 A1 Sep. 16, 2010

Related U.S. Application Data

(60) Provisional application No. 61/160,156, filed on Mar. 13, 2009, provisional application No. 61/160,158, filed on Mar. 13, 2009, provisional application No. 61/160,163, filed on Mar. 13, 2009.

(51) Int. Cl.
*H04W 4/00* (2009.01)
*H04W 72/04* (2009.01)
*H04B 7/26* (2006.01)
*H04W 84/04* (2009.01)
*H04W 88/04* (2009.01)

(52) U.S. Cl.
CPC ........... *H04W 72/042* (2013.01); *H04B 7/2606* (2013.01); *H04W 84/047* (2013.01); *H04W 88/04* (2013.01)
USPC ............................. 370/329; 370/315; 455/450

(58) Field of Classification Search
None
See application file for complete search history.

(56) References Cited

U.S. PATENT DOCUMENTS

| | | |
|---|---|---|
| 2007/0147326 A1* | 6/2007 | Chen ............................ 370/338 |
| 2008/0095038 A1 | 4/2008 | Chang et al. |
| 2008/0107091 A1 | 5/2008 | Ramachandran |
| 2008/0310356 A1 | 12/2008 | Cai et al. |
| 2009/0034458 A1 | 2/2009 | Horn et al. |
| 2009/0207794 A1 | 8/2009 | Meylan et al. |
| 2010/0074209 A1 | 3/2010 | Montojo et al. |
| 2010/0080187 A1* | 4/2010 | Papasakellariou et al. ... 370/329 |
| 2010/0115355 A1 | 5/2010 | Hsu |
| 2010/0120442 A1* | 5/2010 | Zhuang et al. ................ 455/450 |
| 2010/0157927 A1* | 6/2010 | Mochizuki et al. ........... 370/329 |
| 2010/0182939 A1 | 7/2010 | Ojala et al. |
| 2010/0195629 A1 | 8/2010 | Chen et al. |
| 2011/0096717 A1 | 4/2011 | Kim et al. |

(Continued)

FOREIGN PATENT DOCUMENTS

| | | |
|---|---|---|
| CN | 1852190 A | 10/2006 |
| CN | 101072065 A | 11/2007 |

(Continued)

OTHER PUBLICATIONS

PCT Written Opinion of the International Preliminary Examining Authority; PCT Application No. PCT/US2010/027042; mailed Mar. 21, 2011; 5 pgs.

(Continued)

*Primary Examiner* — Chi Pham
*Assistant Examiner* — Mohammad Adhami
(74) *Attorney, Agent, or Firm* — Conley Rose, P.C.; J. Robert Brown, Jr.

(57) ABSTRACT

A method for wireless communication is provided. The method comprises transmitting a relay downlink control information (R-DCI) block in a plurality of resource blocks.

31 Claims, 7 Drawing Sheets

(56) References Cited

U.S. PATENT DOCUMENTS

| | | | |
|---|---|---|---|
| 2011/0122825 A1 | 5/2011 | Lee et al. | |
| 2011/0164584 A1* | 7/2011 | Seo et al. | 370/329 |
| 2011/0194412 A1 | 8/2011 | Park et al. | |
| 2011/0194485 A1* | 8/2011 | Horneman et al. | 370/315 |
| 2011/0194523 A1 | 8/2011 | Chung et al. | |
| 2011/0222428 A1* | 9/2011 | Charbit et al. | 370/252 |
| 2011/0223927 A1* | 9/2011 | Seo et al. | 455/450 |
| 2011/0250897 A1* | 10/2011 | Seo et al. | 455/445 |
| 2011/0268053 A1* | 11/2011 | Che et al. | 370/329 |
| 2012/0039239 A1 | 2/2012 | Park et al. | |
| 2012/0039263 A1 | 2/2012 | Moberg et al. | |
| 2012/0172044 A1 | 7/2012 | Wu | |
| 2013/0148551 A1* | 6/2013 | Lindh et al. | 370/277 |
| 2013/0182679 A1 | 7/2013 | Seo et al. | |

FOREIGN PATENT DOCUMENTS

| | | |
|---|---|---|
| CN | 101146337 A | 3/2008 |
| EP | 1804430 A1 | 7/2007 |
| EP | 1804442 A1 | 7/2007 |
| EP | 1890445 A2 | 2/2008 |
| EP | 1919135 A2 | 5/2008 |
| EP | 1936828 A2 | 6/2008 |
| EP | 1940189 A2 | 7/2008 |
| EP | 1995980 A1 | 11/2008 |
| EP | 2020780 A1 | 2/2009 |
| JP | 2008104195 A | 5/2008 |
| JP | 2012503922 A | 2/2012 |
| KR | 20080089488 A | 10/2008 |
| WO | 2007133022 A1 | 11/2007 |
| WO | 2007148583 A1 | 12/2007 |
| WO | 2008020164 A1 | 2/2008 |
| WO | 2008036784 A2 | 3/2008 |
| WO | 2008057388 A1 | 5/2008 |
| WO | 2008103965 A1 | 8/2008 |
| WO | 2008125905 A2 | 10/2008 |
| WO | 2008133416 A1 | 11/2008 |
| WO | WO 2009/001594 * | 12/2008 |
| WO | 2009018515 A1 | 2/2009 |
| WO | 2010077038 A2 | 7/2010 |

OTHER PUBLICATIONS

PCT Written Opinion of the International Preliminary Examing Authority; PCT Application No. PCT/US2010/027044; mailed Mar. 21; 5 pgs.

PCT Written Opinion of the International Preliminary Examinig Authority; PCT Application No. PCT/US2010/027045; mailed Mar. 21, 2011; 7 pgs.

PCT International Preliminary Report on Patentability; PCT Application No. PCT/US2010/027042; mailed Jun. 16, 2011, 6 pgs.

PCT International Preliminary Report on Patentability; PCT Application No. PCT/US2010/027045; mailed Jun. 16, 2011, 14 pgs.

PCT International Preliminary Report on Patentability; PCT Application No. PCT/US2010/027044; mailed Jun. 20, 2011; 6 pgs.

3GPP TS 36.304 v8.4.0; 3rd Generation Partnership Project; Technical Specification Group Radio Access Network; Evolved Universal Terrestrial Radio Access (E-UTRA); User Equipment (UE) Procedures in Idle Mode; Release 8; Dec. 2008; 29 pgs.

3GPP TS 36.331 v8.4.0; 3rd Generation Partnership Project; Technical Specification Group Radio Access Network;.Evolved Universal Terrestrial Radio Access (E-UTRA) Radio Resource Control (RRC); Protocol Specification; Release 8; Dec. 2008; 198 pgs.

3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.

3GPP TR 36.913 v1.0.0; 3rd Generation Partnership Project; Technical Specification Group Radio Access Network; Requirements for Further Advancements for E-UTRA (LTE-Advanced) Release 8; May 2008; 13 pgs.

IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.

IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.

IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.

Texas Instruments; 3GPP TSG RAN WG1 #54bis; Title: Decode and Forward Relays for E-UTRA Enhancements; R1-083533; Prague, Czech Republic; Sep. 29-Oct. 3, 2008; 5 pgs.

Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.

Ericsson; TSG-RAN WG1 #53; Title: A Discussion on Some Technology Components for LTE-Advanced; R1-082024; Kansas City, Missiouri; May 5-9, 2008; 11 pgs.

China Mobile, Vodafone, Huawei; TSG-RAN WG1 #54; Title: Application Scenarios for LTE-Advanced Relay; R1-082975; Jeju, Korea; Aug. 18-22, 2008; 7 pgs.

Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.

Qualcomm Europe; 3GPP TSG-RAN WG1 #54; Title: Operation of Relays in LTE-A; R1-083191; Jeju, S. Korea; Aug. 18-22, 2008; 5 pgs.

Motorola; TSG-RAN WG1 #54; Title: Classification of Relays; R1-083223; Jeju, South Korea; Aug. 18-22, 2008; 3 pgs.

Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pgs.

TSG-RAN WG1; 3GPP TSG RAN WG1 Meeting #55; Title: LS on Forward Compatibility Support in Rel-8; R1-084538; Prague, Czech Rep.; Nov. 10-14, 2008; 1 pg.

ZTE; TSG-RAN WG1 #56; Title: Control Signaling Structures for Relay Link; R1-090641; Athens, Greece; Feb. 9-13, 2009; 3 pgs.

Nortel; 3GPP TSG-RAN Working Group 1 Meeting #56; Title: Control Channel and Data Channel Design for Relay Link in LTE-Advanced; R1-090753; Athens, Greece; Feb. 9-13, 2009; 9 pgs.

RIML Internal Search Report; Title: Relay Research Overview; Authors: Sam Cai, Jim Womack, and Yi Yu; Oct. 26, 2008; 37 pgs.

Soldani, David et al.; Title: Wireless Relays for Broadband Access; IEEE Communications Magazine; Mar. 2008; pp. 58-66.

Pabst, Ralf et al.; Title: Relay-Based Deployment Concepts for Wireless and Mobile Broadband Radio; IEEE Communications Magazine; Sep. 2004; pp. 80-89.

Yu, Yi, et al.; U.S. Appl. No. 12/722,412, filed Mar. 11, 2010; Title: Relay Reception Synchronization System and Method.

Yu, Yi, et al.; U.S. Appl. No. 12/722,417, filed Mar. 11, 2010; Title: Resource Assignments for Relay System and Method.

PCT International Search Report; PCT Application No. PCT/US2010/027042; mailed Jul. 26, 2010; 3 pgs.

PCT Written Opinion of the International Searching Authority; PCT Application No. PCT/US2010/027042; mailed Jul. 26, 2010; 2 pgs.

PCT International Search Report; PCT Application No. PCT/US2010/027044; mailed Aug. 4, 2010; 3 pgs.

PCT Written Opinion of the International Searching Authority; PCT Application No. PCT/US2010/027044; mailed Aug. 4, 2010; 2 pgs.

PCT International Search Report; PCT Application No. PCT/US2010/027045; mailed Aug. 3, 2010; 4 pgs.

PCT Written Opinion of the International Searching Authority; PCT Application No. PCT/US2010/027045; mailed Aug. 3, 2010; 5 pgs.

Office Action dated Apr. 4, 2012; U.S. Appl. No. 12/722,412, filed Mar. 11, 2010; 23 pages.

Office Action dated Mar. 16, 2012; U.S. Appl. No. 12/722,417, filed Mar. 11, 2012; 18 pages.

Final Office Action dated Aug. 31, 2012; U.S. Appl. No. 12/722,412, filed Mar. 11, 2010; 16 pages.

(56) References Cited

OTHER PUBLICATIONS

Final Office Action dated Jun. 28, 2012; U.S. Appl. No. 12/722,417, filed Mar. 11, 2012; 13 pages.
European Examination Report; Application No. 10709630.7; Jun. 28, 2012; 6 pages.
European Examination Report; Application No. 10709632.3; Jun. 28, 2012; 7 pages.
Advisory Action dated Nov. 6, 2012; U.S. Appl. No. 12/722,412, filed Mar. 11, 2010; 3 pages.
Korean Office Action; Application No. 10-2011-7024107; Oct. 29, 2012; 7 pages.
Mexican Office Action; Application No. MX/a/2011/009585; Oct. 11, 2012; 7 pages.
European Examination Report; Application No. 10709632.3; Dec. 4, 2012; 4 pages.
3GPP TSG RAN WG1 Meeting #55bis; "Consideration on Resource Allocation for Relay Backhaul Link"; R1-090222; Ljubljana, Slovenia; Jan. 12-16, 2009; 5 pages.
TSG-RAN1 #55bis; "Control Channel and Data Channel Design for Relay Link in LTE-Advanced"; R1-090153; Ljubljana, Slovenia; Jan. 12-16, 2009; 17 pages.
3GPP RAN WG1 #55; "Support of Rel-8 Ues by LTE-A Relays"; R1-084384; Prague, Czech Republic; Nov. 10-14, 2008; 20 pages.
Office Action dated May 9, 2013; U.S. Appl. No. 12/722,417, filed Mar. 11, 2012; 24 pages.
Japanese Office Action; Application No. 2011-554212; Feb. 21, 2013; 9 pages.
Korean Office Action; Application No. 10-2011-7024107; Apr. 30, 2013; 6 pages.
Australian Office Action; Application No. 2010224034; Apr. 18, 2013; 3 pages.
Mexican Office Action; Application No. MX/a/2011/009400; Mar. 14, 2013; 7 pages.
European Examination Report; Application No. 10709632.3; Apr. 22, 2013; 5 pages.
Japanese Office Action; Application No. 2011-554214; Apr. 9, 2013; 6 pages.
Final Office Action dated Sep. 6, 2013; U.S. Appl. No. 12/722,417, filed Mar. 11, 2012; 29 pages.
Canadian Office Action; Application No. 2,755,223; Jul. 26, 2013; 2 pages.
Chinese Office Action; Application No. 201080020736.5; Sep. 24, 2013; 17 pages.
Chinese Office Action; Application No. 201080020724.2; Oct. 10, 2013; 13 pages.
Chinese Office Action; Application No. 201080020738.4; Oct. 9, 2013; 22 pages.
European Examination Report; Application No. 10709632.3; Oct. 4, 2013; 3 pages.
Japanese Office Action; Application No. 2011-554214; Aug. 21, 2013; 10 pages.
3GPP TSG RAN WG1 Meeting #56; "Consideration on Resource Allocation for Relay Backhual Link"; R1-090790; 5 pages.
Advisory Action dated Nov. 18, 2013; U.S. Appl. No. 12/722,417, filed Mar. 11, 2010; 5 pages.
Japanese Office Action; Application No. 2011-554213; Jan. 8, 2014; 11 pages.
Canadian Office Action; Application No. 2,755,148; Nov. 25, 2013; 3 pages.
Japanese Final Office Action dated Jan. 14, 2014 as received in co-pending Japanese Application No. 2011-554214; 2 pages; (No English Translation Available).
Chinese Office Action as Received in Co-pending Application No. 201080020736.5 on May 9, 2014; 6 pages. (No English translation available).
Chinese Office Action; Application No. 201080020724.2; Mar. 19, 2014; 7 pages.
Chinese Office Action as Received in Co-pending Application No. 201080020738.4 on Apr. 22, 2014; 13 pages. (No English translation available).
Office Action dated Jul. 15, 2014; U.S. Appl. No. 12/722,412 filed Mar. 11, 2010; 47 pages.
Japanese Final Office Action as Received in Co-pending Application No. 2011-554213 on Jun. 19, 2014; 3 pages. (No English translation available).

* cited by examiner

| Data for donor cell UE 2 | PDSCH | This region cannot be used for Rel 8 donor cell UEs. But it could be used for relay or LTE-A UEs. (region 2) | Data for Relay 1 | Data for donor cell UE 1 |

R-PDCCH
R-PCFICH
R-PHICH
(region 1)

PCFICH/
PHICH/
PDCCH

Figure 7

RELAY LINK CONTROL CHANNEL DESIGN

CROSS-REFERENCE TO RELATED APPLICATIONS

The present application claims priority to U.S. Provisional Patent Application No. 61/160,156, filed Mar. 13, 2009, by Yi Yu, et al, entitled "Relay Link Control Channel Design"; U.S. Provisional Patent Application No. 61/160,158, filed Mar. 13, 2009, by Yi Yu, et al, entitled "Relay Reception Synchronization System and Method"; and U.S. Provisional Patent Application No. 61/160,163, filed Mar. 13, 2009, by Yi Yu, et al., entitled "Resource Assignments for Relay System and Method", all of which are incorporated by reference herein as if reproduced in its entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network nodes with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
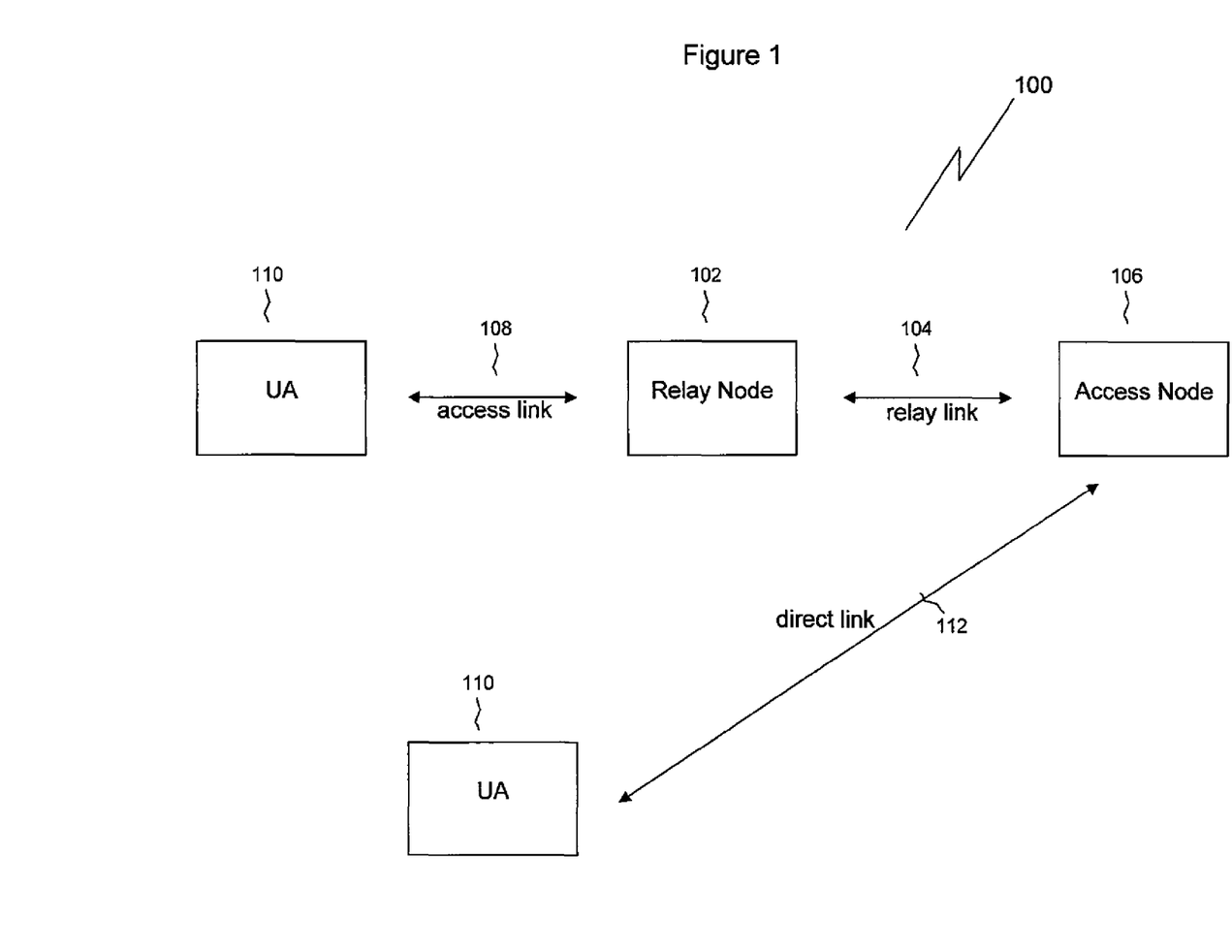
FIG. 1 is a diagram illustrating a wireless communication system that includes a relay node, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks, such as LTE or LTE-Advanced (LTE-A) networks, and all of the disclosed and claimed embodiments could be implemented in an LTE-A network. In some contexts, it may be said that LTE corresponds to release 8 and release 9 while LTE-A corresponds to release 10 and possibly beyond release 10. The relay node 102 can amplify or repeat a signal received from a UA 110 and cause the modified signal to be received at an access node 106. In some implementations of a relay node 102, the relay node 102 receives a signal with data from the UA 110 and then generates a new and/or different signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate using the same amount of bandwidth creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can demodulate and decode a transmission that it receives, re-encode the result of the decoding, and then transmit the modulated data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) or other relay node to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

Figure 2:
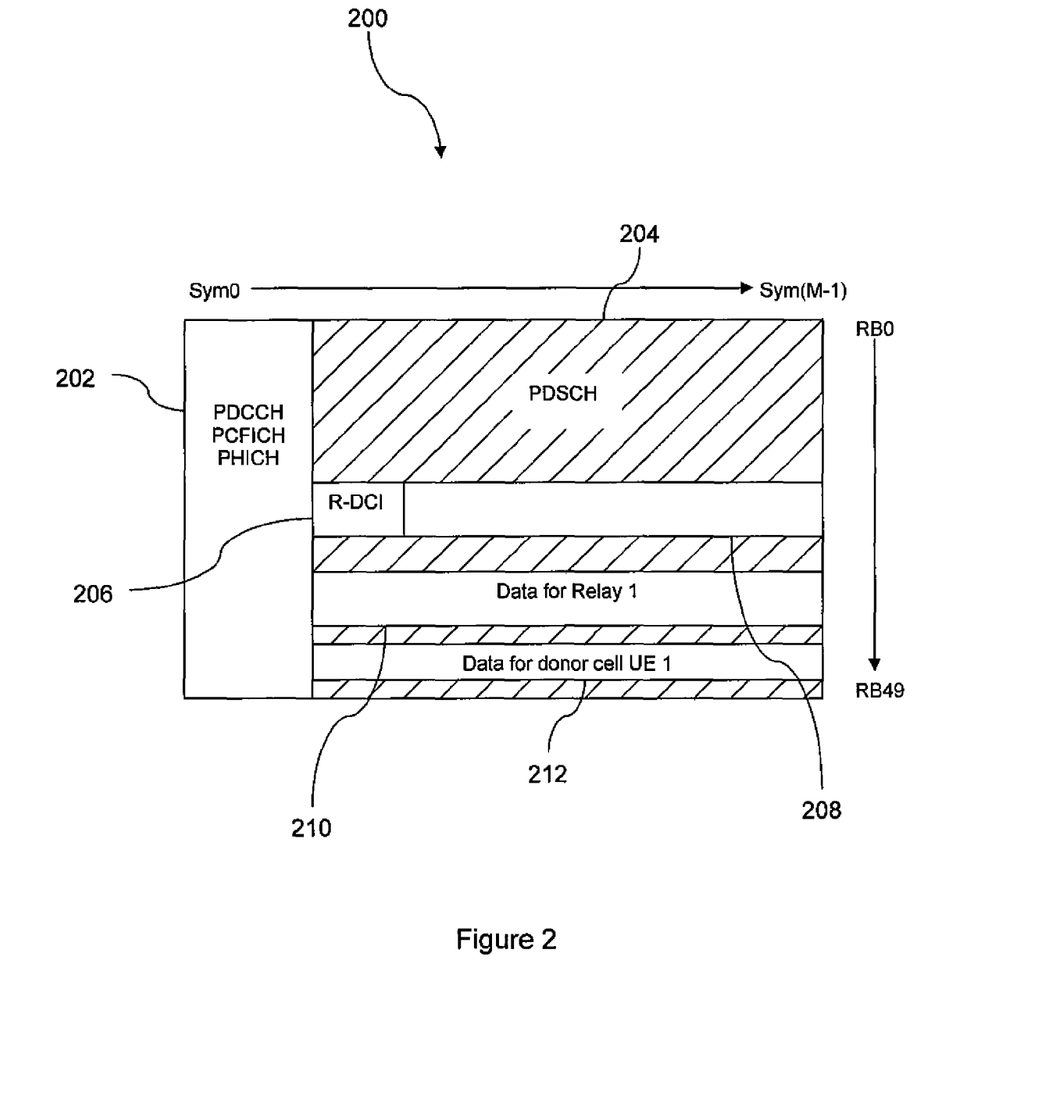
FIG. 2 is a diagram of a carrier downlink subframe according to an embodiment of the disclosure.

Turning now to FIG. 2, a carrier downlink subframe 200 is discussed. The carrier downlink subframe 200 may be transmitted by the access node 106 and received by the relay node 102 via the relay link and/or the UA 110 via the direct link 112. The carrier downlink subframe 200 comprises a plurality of orthogonal frequency multiplexing (OFDM) symbols sequenced from left to right from symbol 0 to symbol M−1, where the symbol 0 is transmitted by the access node 106 before the symbol 1 is transmitted by the access node 106, where the symbol 1 is transmitted by the access node 106 before the symbol 2 is transmitted by the access node 106, and so forth. An OFDM symbol is different from a data symbol. A data symbol is user information that has gone through at least one encoding step. An OFDM symbol is a series of data symbols, each modulated on a contiguous series of OFDM subcarriers. A collection of M symbols comprises a physical resource block. The carrier downlink subframe 200 comprises a plurality of physical resource blocks. While FIG. 2 illustrates the carrier downlink subframe 200 comprising 50 physical resource blocks RB0 through RB49, it is understood that in other embodiments the carrier downlink subframe 200 may comprise either fewer or more resource blocks.

Downlink control information may be provided in the first OFDM symbols 202 of the subframe 200. The downlink control information provided in the first OFDM symbols 202 may comprise one or more of a physical downlink control channel (PDCCH), a physical control format information channel (PCFICH), and a physical hybrid automatic repeat request indicator channel (PHICH). These control channels are intended for the use of UEs and may be ignored by the relay node. The remainder of the OFDM symbols in the downlink subframe 200 after the first block 202 may be referred to as a physical downlink shared channel (PDSCH) 204 that in LTE is intended for user plane data being sent to UEs. In LTE-A the PDSCH 204 may comprise a relay downlink control information (R-DCI) block 206 containing control information directed to the relay node 102. In an embodiment, it is possible that the relay node 102 is in a fixed location and has good link quality.

In an embodiment, the R-DCI block 206 is preferably transmitted by the access node 106 in about a middle of or a center frequency range of the resource blocks. In an embodiment, the number of resource blocks used for the R-DCI block 206 may be pre-configured and/or fixed. In another embodiment, however, the number of resource blocks used for the R-DCI block 206 may be dynamically defined and may be conveyed to the relay node 102 by a variety of mechanisms including in a higher layer message. In an embodiment, the R-DCI block 206 may be transmitted by the access node 106 between resource block 19 and resource block 30, for example in one or more of resource block 20 through resource block 29. In an embodiment, the R-DCI block 206 is transmitted by the access node 106 in a plurality of adjacent resource blocks. In an embodiment, the R-DCI block 206 is transmitted by the access node 106 in a plurality of contiguous resource blocks. In another embodiment, the R-DCI block 206 is transmitted by the access node 106 in a plurality of non-contiguous resource blocks. It is contemplated by the present disclosure that, by confining the resource blocks of the R-DCI block 206 to a sub-range of the carrier frequency band, some embodiments of the relay node 102 may deploy a radio transceiver configured to operate over the subject subrange of the carrier frequency band, possibly reducing the cost of the relay nodes 102.

In an embodiment, the access node 106 may modulate and transmit the R-DCI block 206 using a relatively high modulation order because the relay link 104 has a relatively high link quality. In an embodiment, the access node 106 may be configured to use one of a 16-quadrature amplitude modulation (QAM) modulation constellation, a 64-QAM modulation constellation, and a 256-QAM modulation constellation to modulate and transmit the R-DCI block 206 to the relay node 102. The R-DCI in one subframe may use a different modulation constellation than in a previous or subsequent subframe. Correspondingly, in an embodiment, the relay node 102 may be configured to demodulate the R-DCI block 206 using one of a 16-QAM modulation constellation, a 64-QAM modulation constellation, and a 256-QAM modulation constellation. In one embodiment, the modulation information is pre-configured and/or fixed.

In an embodiment, the R-DCI block 206 may comprise a fixed number of OFDM symbols, for example one OFDM symbol or two OFDM symbols. Alternatively, in another embodiment, the R-DCI block 206 may comprise a variable number N of OFDM symbols. The present disclosure contemplates a number of design alternatives for providing the value of the number N to the relay node 102. In one embodiment, the R-DCI block 206 may comprise a relay physical control format information channel (R-PCFICH) that conveys the value of the number N from the access node 106 to the relay node 102. In an embodiment, the R-PCFICH may be located in the first OFDM symbol of the R-DCI block 206. In another embodiment, the access node 106 may convey and/or signal the value of the number N to the relay node 102 via one of a broadcast control channel (BCCH) and a medium access control (MAC) control element. In another embodiment, the access node 106 may convey and/or signal the value of the number N to the relay node 102 via a radio resource control (RRC) element. In another embodiment, the access node 106 may convey and/or signal the value of the number N to the relay node 102 via a higher layer message.

In an embodiment, the R-DCI block 206 may comprise the R-PCFICH information described above. Additionally, in an embodiment, the R-DCI block 206 may further comprise a relay physical downlink control channel (R-PDCCH) and/or a relay downlink physical hybrid automatic repeat request indicator channel (R-PHICH). In an embodiment, the number of OFDM symbols and/or the number of resource blocks allocated to the R-PCFICH, the R-PDCCH, and the R-PHICH may be configured by the access node 106.

In an embodiment, the relay data may be placed anywhere in the PDSCH block 204 but not in the R-DCI block 206. The relay data may be assigned and modulated anywhere in the PDSCH 204 or following the R-DCI 206. The relay data may comprise traffic for the relay node 102 to relay on to the UA 110 via the access link 108. The relay data may also comprise higher layer control signals directed to the relay node 102. In an embodiment, the downlink grants for the relay data may be placed in the same resource blocks that are allocated to the R-DCI block 206 for symbols after the R-DCI block 206 has been transmitted, for example the second block 208. Alternatively, the downlink grants for the relay data may be assigned to a different set of resource blocks, for example the third block 210. In an embodiment, a UA 110 may be in communication with the access node 106 via the direct link 112 and may receive a downlink grant for data in the fourth block 212. One skilled in the art will readily appreciate that the location of the second, third, and fourth blocks 208, 210, 212 are exemplary and may be located in different places within the PDSCH block 204. In an embodiment, a legacy UA 110 may not be assigned a downlink grant in the second block 208. In another embodiment, a future or more advanced UA 110 may be assigned a downlink grant in the second block 208.

Figure 3:
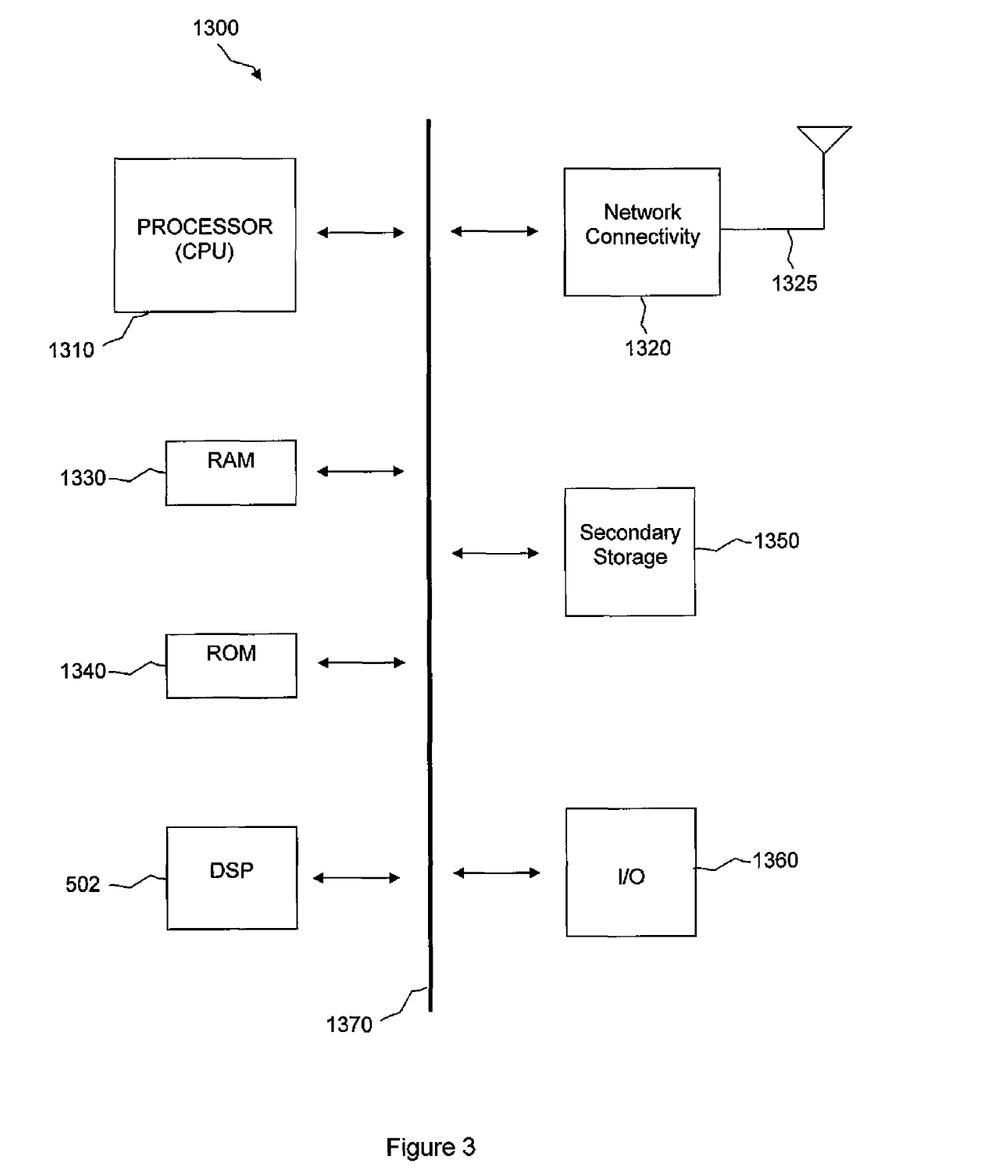
FIG. 3 illustrates a processor and related components suitable for implementing the several embodiments of the present disclosure.

The UA 110 and other components described above might include a processing component that is capable of executing instructions related to the actions described above. FIG. 3 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1302. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

Additional embodiments and disclosure are now provided.

Relays can be used to enhance system throughput and extend coverage. One way to view a relay in an LTE-A system is as two back-to-back transceivers, one that communicates with an access node and one that communicates with a UE. It is technically difficult and probably expensive to design a relay node that has sufficient radio frequency front-end isolation to allow the relay to receive and transmit on the same frequency. This has the implication that there may need to be some sort of time-division duplex (TDD) scheme that allows the relay to receive at one time on a particular frequency and later to transmit on it.

Figure 4:
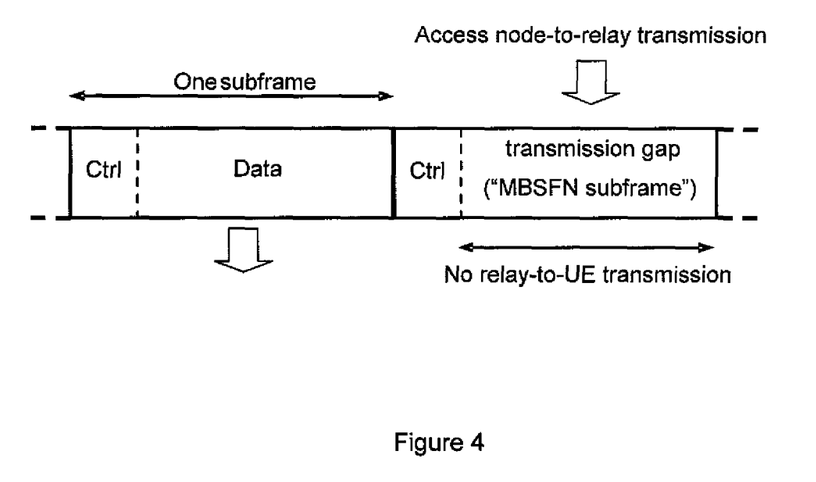
FIG. 4 illustrates subframes in a relay-based transmission, according to an embodiment of the disclosure.

Relays are being specified for Release 10 (R10) deployments. In order for a relay to support Release 8 (R8) UEs, there may need to be a downlink transmission of at least the physical control channel information (PDCCH) on every subframe. The control channel transmission comprises the first few OFDM symbols (between 1 and 4). If the transmission has only a PDCCH, it is called an MBSFN subframe. (There are legacy reasons for this name.) MBSFN subframes are used to allow downlink transfers from the access node to the relay on the relay link, as shown in FIG. 4. The downlink transfer of information from the access node to the relay is called the downlink backhaul.

During an MBSFN subframe, the relay transmits the control region (e.g., PDCCH) on the downlink (to the UE) and then in some way disables its transmitter and starts receiving the downlink transmission from the access node for at least most, if not all, of the remaining part of the MBSFN subframe. Because of R8 UE requirements, a relay may be required to transmit at least a PDCCH symbol on every subframe. This means that the only time a relay can receive downlink backhaul information from the access node is during an MBSFN subframe.

In an MBSFN subframe, the control region can be one or two OFDM symbols. However, the control region of a normal subframe can be up to 3 or 4 OFDM symbols. The relay cannot receive data from the access node during the control region of the relay MBSFN subframe. After the control region, the relay node can receive the data from the access node. Due to the potential discrepancy in the size of the control region of a normal subframe and the size of the control region of the relay MBSFN subframe, three different scenarios could arise.

Figure 5:
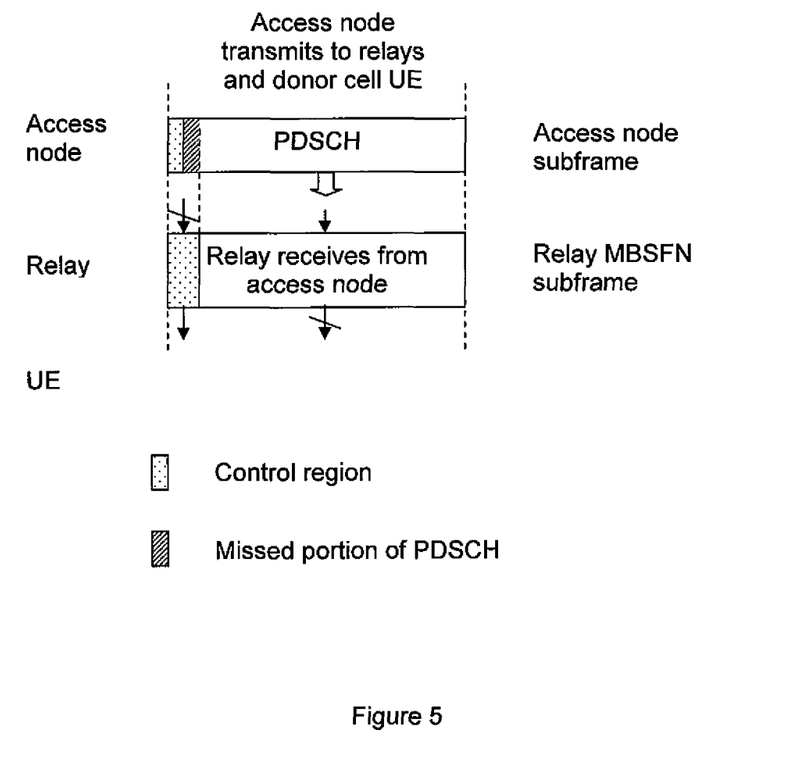
FIG. 5 illustrates an example of a discrepancy in control region sizes, according to an embodiment of the disclosure.

In a first scenario, the relay MBSFN subframe has a larger control region than the corresponding access node subframe. For example, the control region of the relay MBSFN subframe might have two OFDM symbols, while the control region of the access node subframe might have only one OFDM symbol. This scenario is shown in FIG. 5. In this case, the relay may miss a part of the PDSCH of the access node subframe.

Figure 6:
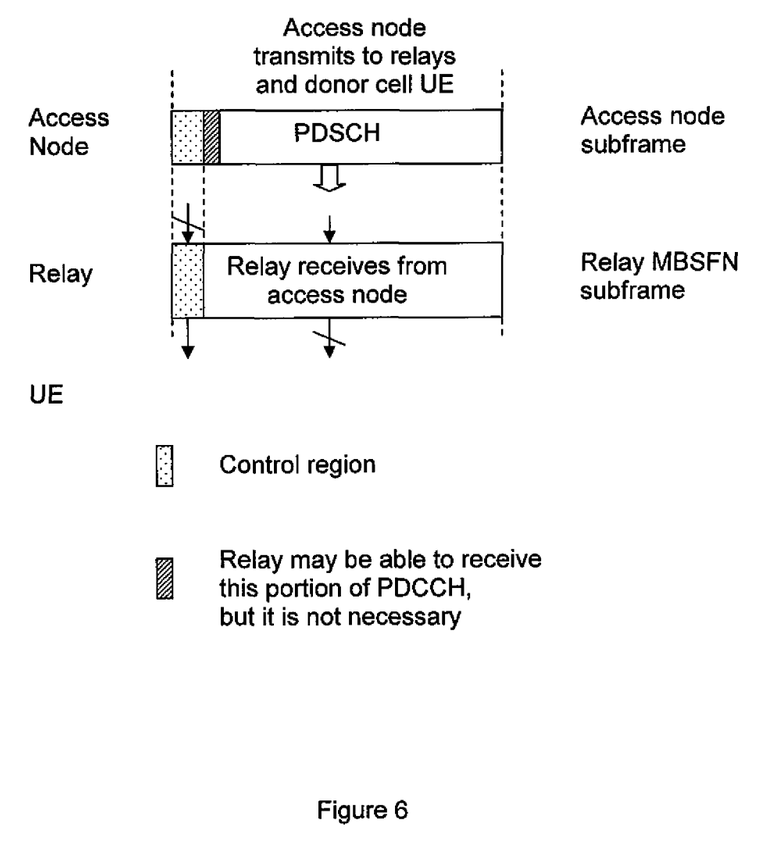
FIG. 6 illustrates another example of a discrepancy in control region sizes, according to an embodiment of the disclosure.

In a second scenario, the relay MBSFN subframe has a smaller control region than the corresponding access node subframe. For example, the control region of relay MBSFN subframe might have two OFDM symbols, while the control region of the access node subframe might have three OFDM symbols. This scenario is shown in FIG. 6. In this case, the relay may attempt to start receiving the PDSCH of the access node subframe earlier than necessary. The relay can ignore the received symbols until the PDSCH portion of the subframe starts. No data loss over the access node subframe will occur from point of view of the relay.

In a third scenario, the relay MBSFN subframe has the same size control region as the corresponding access node subframe. For example, the control region of the relay MBSFN subframe might have two OFDM symbols, and the control region of the access node subframe might also have two OFDM symbols. In this case, the relay node can start to receive the PDSCH of the access node subframe exactly on time. But considering the relay switching delay, some data loss may occur.

Two possible solutions for the above problems might be implemented on the access node transmission side. In one solution, during the relay MBSFN subframe, the access node subframe has a fixed-size control region. For example, the access node subframe could be fixed at two OFDM symbols. Alternatively, considering the possible delay for the relay to switch from transmit mode to receive mode, the control region of the access node subframe could be fixed at three OFDM symbols. In this solution, the relay will never miss any data from the access node. The size of the fixed control region for the access node during the relay MBSFN subframe can be configured semi-statically and broadcast on the broadcast control channel (BCCH) to the relay.

In another solution, the control region of the access node subframe is flexible. Inside the PDSCH, the access node transmits data to the relay starting from the second or third OFDM symbol regardless of the control region of the access node subframe.

The first of these two solutions may be slightly preferred since it simplifies the relay control channel design and the relay data transmission from the access node.

In either of these solutions, on the relay reception side, the starting time of the relay reception during a MBSFN subframe can be semi-statically configured to the relay node by the access node.

The relay can receive the relay link downlink transmission only after transmitting the first N PDCCH MBSFN symbols on the access link. Since the PCFICH and PHICH are always transmitted in the first OFDM symbol, the existing R8 control channel design including PCFICH and PHICH cannot be received by the relay. Hence, a new control channel may need to be designed for the data being sent to the relay on the downlink backhaul. In an embodiment, the data could fit in the unused OFDM symbols that follow the PDCCH (i.e., in the PDCCH).

The design of an efficient relay control channel may need to take into consideration that fact that the access node may transmit to donor cell UEs and relays during the same downlink subframe and the fact that the relatively small number of relays in a cell compared to UEs and the expected good link quality mean that the amount of relay control information may be limited and invariant.

The amount of relay downlink control information may be small for one or more of the following three reasons. First, the control information consists mostly of downlink and uplink grants. Since the number of relays in the system is smaller than the number of UEs, the number of grants will be smaller. It can be assumed that there will be a data aggregation scheme such that the data for many UEs will be consolidated and sent to the relay using the relay's ID. Hence, the downlink relay control information may not require as much resource as the current PDCCH.

Second, the relay link is fixed and has better link quality than the access link. A higher modulation order on the physical control channel (e.g., 16-QAM or 64-QAM), as well as spatial multiplexing, may be used to reduce the required physical resources for the relay control channel.

Third, the relay link control information is directed to the relay node only (using the relay ID). Therefore, when the access node transmits multiple users' data to the relay, only one joint downlink grant is delivered to the relay node using the relay ID (i.e., there is no separate control information per user). This further reduces the control information amount for the relay link.

Figure 7:
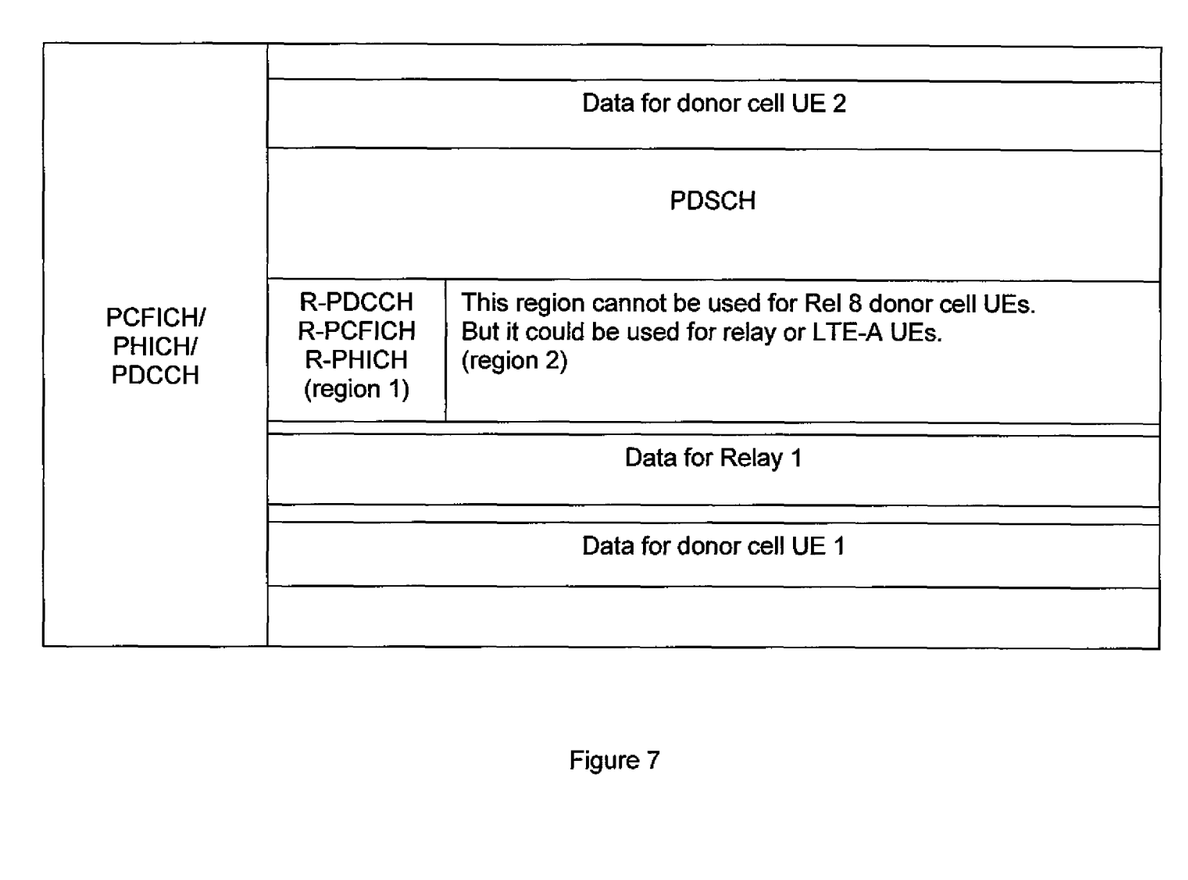
FIG. 7 illustrates a relay control channel structure, according to an embodiment of the disclosure.

FIG. 7 shows the relay downlink control information (R-DCI) being transmitted in the resource blocks (RBs) at the center of the carrier. In an embodiment, the number of RBs can be pre-configured. Also, in an embodiment, the number of OFDM symbols of the R-DCI is indicated by the relay physical control format indicator channel (R-PCFICH) in a manner similar to that of the PCFICH. The remaining OFDM symbols in the MBSFN subframe after the R-DCI can be used for downlink data transmission for the relay or LTE-A (R10) UEs. This area cannot be used for R8 UEs since they cannot understand an R-DCI that will be specified in a later release. From the scheduler point of view, the relay and the R10 UEs can be assigned any RBs over the PDSCH portion of the MBSFN subframe, while the R8 UEs can be assigned to any RBs outside the R-DCI.

The R-PCFICH can be located at the first symbol of the R-DCI but spread in frequency for diversity gain. In an embodiment, after receiving the R-PCFICH, the relay blindly decodes the relay physical downlink control channel (R-PDCCH) based on the relay ID in a manner similar to how a R8 UE decodes the PDCCH. In the R-PDCCH, grant messages can be formatted in a way that the relay knows how to receive data following the R-DCI or in the PDSCH. If the relay node successfully decodes the R-PDCCH, the relay node will be able to find any physical resource for the shared channel data transmission.

To avoid interference, the access node does not use the reserved R-PDCCH and R-PCFICH resources for data transmission with donor cell UEs. A few resource blocks in the middle of the downlink channel can be reserved to place the R-PDCCH and the R-PCFICH. The R-PDCCH may need to be kept as narrow as possible; however, as demand increases it may widen. The location of the RBs that contain the R-PDCCH can be configured by the access node.

Placing the limited number of reserved PRBs for the relay control channel around the center frequency has at least two advantages. First, the relay node may have a smaller bandwidth compared to the access node. Placing the control channel in the center frequency can ensure that a relay node with smaller bandwidth is still able to receive the relay control information. If the control channel is distributed over the whole band or placed at the band edge, the relay node may need the same bandwidth configuration as the access node. Second, limiting the number of RBs for the relay control information increases the scheduling flexibility for the donor cell UEs. As seen in FIG. 7, the resources used to transmit the donor cell UEs are the RBs in region 3 excluding region 1 and region 2. Therefore, by limiting the frequency domain size of region 1 and region 2, the donor cell UEs can have more scheduling flexibility.

In the R-DCI, the access node may grant uplink resources for the relay-to-access node transmission. Currently in the R8 LTE specification, the uplink grant for the UEs is only valid for one subframe. For each uplink transmission, the access node may need to send an uplink grant unless semi-persistent scheduling is configured. Since the relay can only listen to the access node on certain subframes (the MBSFN subframes), and it is be difficult for the UE to transmit during the MBSFN subframe, more flexibility in the uplink scheduling grant information might be needed. In particular, it may be useful to have the ability to assign the subframe information in the relay uplink grant. In an embodiment, in one uplink grant, multiple uplink transmission opportunities are given to the relay instead of only one uplink transmission opportunity per grant. For example, in the uplink grant for the relay, the access node can notify the relay that it can transmit later.

In an embodiment, a wireless communication system is provided. The system comprises an access node configured to transmit an R-DCI in a plurality of resource blocks.

In another embodiment, another wireless communication system is provided. The system comprises a relay node configured to receive an R-DCI in a plurality of resource blocks.

In another embodiment, a method is provided for wireless communication. The method comprises transmitting an R-DCI block in a plurality of resource blocks.

In another embodiment, another method is provided for wireless communication. The method comprises receiving an R-DCI block in a plurality of resource blocks.

The following are incorporated herein by reference for all purposes: 3rd Generation Partnership Project (3GPP) Technical Specification (TS) 36.813 and 3GPP TS 36.814.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An access node, comprising:
a processor configured to control a transmitter to semi-statically transmit to a relay node, via Radio Resource Control (RRC) signaling, an indication of a number of resource blocks (R) for a relay downlink control information (R-DCI) block, wherein the R-DCI block is transmitted using a number of resource blocks corresponding to R and a number of orthogonal frequency division multiplexing (OFDM) symbols, and
wherein the transmitter is further configured to transmit, to the relay node, a downlink grant using a relay identification (ID), on a physical downlink shared channel (PDSCH) resource block for relay data.

2. The access node of claim 1, wherein the R-DCI is transmitted in fixed OFDM resource blocks.

3. The access node of claim 1, wherein the access node is further configured to transmit relay data anywhere in the physical downlink shared channel (PDSCH).

4. A relay node, comprising:
a processor configured to control a receiver to semi-statically receive from an access node, via Radio Resource Control (RRC) signaling, an indication of a number of resource blocks (R) for a relay downlink control information (R-DCI) block, wherein the R-DCI block is transmitted using a number of resource blocks corresponding to R and a number of orthogonal frequency division multiplexing (OFDM) symbols,
wherein the receiver is further configured to receive, from the access node, a downlink grant using a relay identification (ID), on a physical downlink shared channel (PDSCH) resource block for relay data.

5. The relay node of claim 4, wherein the R-DCI is transmitted in fixed orthogonal frequency division multiplexing (OFDM) resource blocks.

6. The relay node of claim 4, wherein the R-DCI comprises a relay physical control format indicator channel (R-PCFICH).

7. The relay node of claim 6, wherein the R-PCFICH is received in the first OFDM symbol of the R-DCI.

8. The relay node of claim 4, wherein the R-DCI comprises at least one of a relay physical downlink control channel (R-PDCCH), a relay physical control format indicator channel (R-PCFICH), and a relay physical hybrid automatic repeat request indicator channel (P-PHICH).

9. A method of wireless communication implemented in an access node, the method comprising:
transmitting semi-statically to a relay node, via Radio Resource Control (RRC) signaling, an indication of a number of resource blocks (R) for a relay downlink control information (R-DCI) block;
transmitting the R-DCI block using a number of resource blocks corresponding to R and a number of orthogonal frequency division multiplexing (OFDM) symbols; and
transmitting, to the relay node, a downlink grant using a relay identification (ID), on a physical downlink shared channel (PDSCH) resource block for relay data.

10. The method of claim 9, wherein the R-DCI block comprises a fixed number of orthogonal frequency division multiplexing (OFDM) symbols.

11. The method of claim 9, wherein the R-DCI is transmitted in fixed OFDM resource blocks.

12. A method of wireless communication implemented in a relay node, the method comprising:
receiving semi-statically from an access node, via Radio Resource Control (RRC) signaling, an indication of a number of resource blocks (R) for a relay downlink control information (R-DCI) block, wherein the R-DCI is transmitted using a number of resource blocks corresponding to R and a number of orthogonal frequency division multiplexing (OFDM) symbols, and
wherein the relay node is configured to receive, from the access node, a downlink grant using a relay identification (ID), on a physical downlink shared channel (PDSCH) for relay data.

13. The method of claim 12, wherein the receiving is based on a fixed length R-DCI block.

14. The method of claim 12, wherein the R-DCI is transmitted in fixed orthogonal frequency division multiplexing (OFDM) resource blocks.

15. The method of claim 12, wherein the number of OFDM symbols is conveyed in a relay physical control format indicator channel (R-PCFICH) contained in the first OFDM symbol of the R-DCI, where the number of OFDM symbols designates the number of OFDM symbols contained by the R-DCI block.

16. The access node of claim 1, wherein the number of OFDM symbols is variable.

17. The access node of claim 1, wherein the number of OFDM symbols is fixed.

18. The access node of claim 1, wherein the R-DCI block begins at a fixed OFDM symbol.

19. The access node of claim 18, wherein the fixed OFDM symbol is the fourth OFDM symbol.

20. The relay node of claim 4, wherein the number of OFDM symbols is variable.

21. The relay node of claim 4, wherein the number of OFDM symbols is fixed.

22. The relay node of claim 4, wherein the R-DCI block begins at a fixed OFDM symbol.

23. The relay node of claim 22, wherein the fixed OFDM symbol is the fourth OFDM symbol.

24. The method of claim 9, wherein the number of OFDM symbols is variable.

25. The method of claim 9, wherein the number of OFDM symbols is fixed.

26. The method of claim 9, wherein the R-DCI block begins at a fixed OFDM symbol.

27. The method of claim 26, wherein the fixed OFDM symbol is the fourth OFDM symbol.

28. The method of claim 12, wherein the number of OFDM symbols is variable.

29. The method of claim 12, wherein the number of OFDM symbols is fixed.

30. The method of claim 12, wherein the R-DCI block begins at a fixed OFDM symbol.

31. The method of claim 30, wherein the fixed OFDM symbol is the fourth OFDM symbol.

* * * * *